(12) United States Patent
Navarro et al.

(10) Patent No.: US 12,512,726 B2
(45) Date of Patent: Dec. 30, 2025

(54) 4-PHASE MOTOR AND GENERATOR DEVICE

(71) Applicants: Thomas Navarro, Wheat Ridge, CO (US); Zachary J. Navarro, West Minister, CO (US); Tiffany J. Navarro, Denver, CO (US)

(72) Inventors: Thomas Navarro, Wheat Ridge, CO (US); Zachary J. Navarro, West Minister, CO (US); Tiffany J. Navarro, Denver, CO (US)

( * ) Notice: Subject to any disclaimer, the term of this patent is extended or adjusted under 35 U.S.C. 154(b) by 255 days.

(21) Appl. No.: 18/301,764

(22) Filed: Apr. 17, 2023

(65) Prior Publication Data

US 2024/0146150 A1    May 2, 2024

Related U.S. Application Data

(60) Provisional application No. 63/419,373, filed on Oct. 26, 2022.

(51) Int. Cl.
| | | |
|---|---|---|
| *H02K 7/18* | (2006.01) | |
| *H02K 1/17* | (2006.01) | |
| *H02K 3/28* | (2006.01) | |
| *H02K 7/06* | (2006.01) | |

(52) U.S. Cl.
CPC ............ *H02K 7/1807* (2013.01); *H02K 1/17* (2013.01); *H02K 3/28* (2013.01); *H02K 7/063* (2013.01)

(58) Field of Classification Search
CPC .......... H02K 7/1807; H02K 1/17; H02K 3/28; H02K 7/063; H02K 21/042; H02K 21/16
USPC .................................................. 310/112, 113
See application file for complete search history.

(56) References Cited

U.S. PATENT DOCUMENTS

| | | | | |
|---|---|---|---|---|
| 3,268,749 | A * | 8/1966 | Hisashi | H02K 7/063 74/61 |
| 5,153,473 | A * | 10/1992 | Russell | H02K 41/03 318/114 |
| 8,461,736 | B2 * | 6/2013 | Bruno | H02K 16/00 310/156.28 |
| 10,763,772 | B1 * | 9/2020 | Fatemi | H02P 25/086 |
| 2008/0054745 | A1 * | 3/2008 | Sentmanat | A61M 60/546 310/156.01 |
| 2011/0121669 | A1 * | 5/2011 | Lacour | H02K 7/116 310/156.01 |
| 2014/0184002 | A1 * | 7/2014 | Levin | H02K 7/08 310/90 |
| 2020/0280241 | A1 * | 9/2020 | Lahr | H02K 16/02 |

(Continued)

*Primary Examiner* — Ahmed Elnakib
(74) *Attorney, Agent, or Firm* — Hall Estill Law Firm

(57) ABSTRACT

The invention relates to a novel 4-phase motor and generator device with increased efficiency for generating electrical energy. The device features a stator wall with eight stator slots and four pole groups, and an armature rotatable within the stator wall. The eight stator slots are divided into four pole groups of opposing stator slots, the two opposing stator slots include a N stator slot and a S stator slot. N and S stator slots are alternatively activated in response to rotation of the armature. The activation of the pole groups results in a rotating magnetic field within the stator wall, and only six of the eight poles are actively coupled in any given configuration. The invention also includes a method of operating the motor for generating electrical energy with increased efficiency and an environmentally friendly manner compared to conventional motors.

17 Claims, 5 Drawing Sheets

(56) References Cited

U.S. PATENT DOCUMENTS

2020/0343846 A1* 10/2020 Fatemi .................. H02K 41/06
2023/0378893 A1* 11/2023 Petersen ................ H02P 21/18
2024/0146150 A1*  5/2024 Navarro ................ H02K 21/16

* cited by examiner

4-PHASE MOTOR AND GENERATOR DEVICE

CROSS-REFERENCE TO RELATED APPLICATION

The present application claims priority to, and the benefit of, U.S. Provisional Application No. 63/419,373, which was filed on Oct. 26, 2022, and is incorporated herein by reference in its entirety.

FIELD OF THE INVENTION

The present invention relates generally to the field of electric generators. More specifically, the present invention relates to a novel 4-phase electric motor and generator device. The device having a stator wall with eight stator slots and four pole groups for generating electrical energy with increased efficiency compared to conventional generators. The generator has less vibrations and improved rotor mass. Accordingly, the present disclosure makes specific reference thereto. Nonetheless, it is to be appreciated that aspects of the present invention are also equally applicable to other like applications, devices, and methods of manufacture.

BACKGROUND

By way of background, electric power consumption is necessary for a quality life and people often use electricity for lighting, heating, cooling, and refrigeration and for operating appliances, computers, electronics, machinery, and public transportation systems and more. In fact, electricity consumption is an essential component of the modern life. However, increased electric power consumption can be harmful for the environment and ultimately lead to global warming. Enormous volume of $CO2$ emissions, due to worldwide consumption of the electric energy, has started to cause serious environmental problems such as global warming. Reducing use of electric energy saves money, increases our energy security, and reduces the pollution that is emitted from non-renewable sources of energy.

Generally, all parts of the electricity system can affect the environment, and the size of these impacts will depend on how and where the electricity is generated and delivered. Electricity generation can generate solid waste, which may include hazardous waste and emissions of greenhouse gases and other air pollutants, that affect the atmosphere. Conventional single, 2-phase, and 3-phase generators use considerable power and are ineffective at generating electricity. Single phase generators are affordable but have the least efficiency and are commonly found for residential applications. 3-phase generators are more efficient than single phase and 2-phase generators but are not 100% efficient and are commonly used for industrial applications. All types of conventional generators also cause excessive vibrations, which can cause an unbalance in the rotor of the generator and prevent the generator from running smoothly. People desire improved generators that are more efficient and environment friendly.

Therefore, there exists a long-felt need in the art for an electric generator designed to produce environmentally friendly electric power. There is also a long-felt need in the art for an electric generator that is more efficient than existing single, 2-phase, and 3-phase generators. Additionally, there is a long-felt need in the art for a novel electric generator that can be used for both residential applications and industrial applications. Moreover, there is a long-felt need in the art for an electric generator that has improved rotor balance and does not cause excessive vibrations. Further, there is a long-felt need in the art for an electric generator that consumes less power for generating electricity. Finally, there is a long-felt need in the art for a 4-phase electric generator that is configured to reduce harmful effects on the environment such as greenhouse gas emissions.

The subject matter disclosed and claimed herein, in one embodiment thereof, comprises a 4-phase motor and generator device. The device is configured to be more efficient than single phase, 2-phase, and 3-phase generators and is environmentally friendly. The device further comprising a stator wall having a circular or cylindrical shape, eight stator slots disposed in the stator wall, the eight stator slots are divided into four pole groups of two opposing stator slots, each slot of the two opposing stator slots are connected via a common coil, the common coil also connects to an output and to a neutral point, one slot of the two opposing stator slots having North polarity (N stator slot) and the other slot having South polarity (S stator slot), four of the stator slots on one side of the stator wall correspond to the other four of the stator slots on an opposing side of the stator wall, an armature, and the device is further configured to alternate activation between N stator slots and S stator slots of the four pole groups in response to rotation of the armature, wherein only six of the eight poles are actively coupled in any given configuration.

In this manner, the 4-phase motor and generator of the present invention accomplishes all of the forgoing objectives and provides users with a 4-phase electric motor designed to produce efficient and environmentally friendly power. The generator allows people to utilize the generated power in numerous ways like powering homes, vehicles, and more. Also, the generator is good for the environment and reduces harmful effects on the environment like greenhouse gas emissions.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a 4-phase motor and generator device. The device is configured to be more efficient than 3-phase generators. The device further comprising a stator wall having a circular or cylindrical shape, eight stator slots disposed in the stator wall, the eight stator slots are divided into four groups of two opposing stator slots, each slot of the two opposing stator slots are connected via a common coil, one slot of the two opposing stator slots having North polarity (N stator slot) and the other slot having South polarity (S stator slot), the four groups forming the four pole groups, wherein four of the stator slots on one side of the stator wall correspond to the other four of the stator slots on an opposing side of the stator wall, an armature, and the device is further configured to alternate activation between N stator slots and S stator slots of the four pole groups in response to rotation of the armature, wherein only six of the eight poles are actively coupled in any given configuration.

The subject matter disclosed and claimed herein, in one embodiment thereof, comprises a method of operating a 4-Phase Motor and Generator device. The method comprising the steps of rotating an armature along a stator wall, the stator wall having a circular or cylindrical shape, eight stator slots divided into four pole groups, each pole group has a N stator slot and a S stator slot, wherein four of the stator slots on one side of the stator wall correspond to the other four of the stator slots on an opposing side of the stator wall; alternating activation between N stator slots and S stator slots of the four pole groups in response to the rotation of the armature, wherein only six of the eight poles are actively coupled in any given configuration; and generating electrical energy with increased efficiency compared to 1-phase, 2-phase, or 3-phase motors.

In yet another embodiment, the activation of the pole groups results in a rotating magnetic field within the stator wall.

In another aspect of the present invention, the stator slots are arranged in a symmetrical pattern around the stator wall.

In yet another embodiment, the stator wall is made of a magnetic material.

In yet another embodiment, a 4-phase generator comprising a stator wall and an armature is disclosed. The stator wall having four phases of functional operation and a circular or cylindrical shape with eight stator slots divided into four pole groups, each pole group having a N stator pole and a S stator pole, an eccentric load or rotor mass diagram, including eccentric load or rotor mass I, G, H, and J, located at specific distances E and F from the center axis of rotation of the stator wall, wherein the eccentric load or rotor mass diagram enables the generator to operate efficiently and generate power while compensating for the eccentric load or rotor masses.

In yet another embodiment, the 4-phase motor and generator device of the present invention is easily and efficiently manufactured, marketed, and available to consumers in cost-effective manner and is easily used by users for generating power in numerous ways like powering homes, vehicles, and more.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
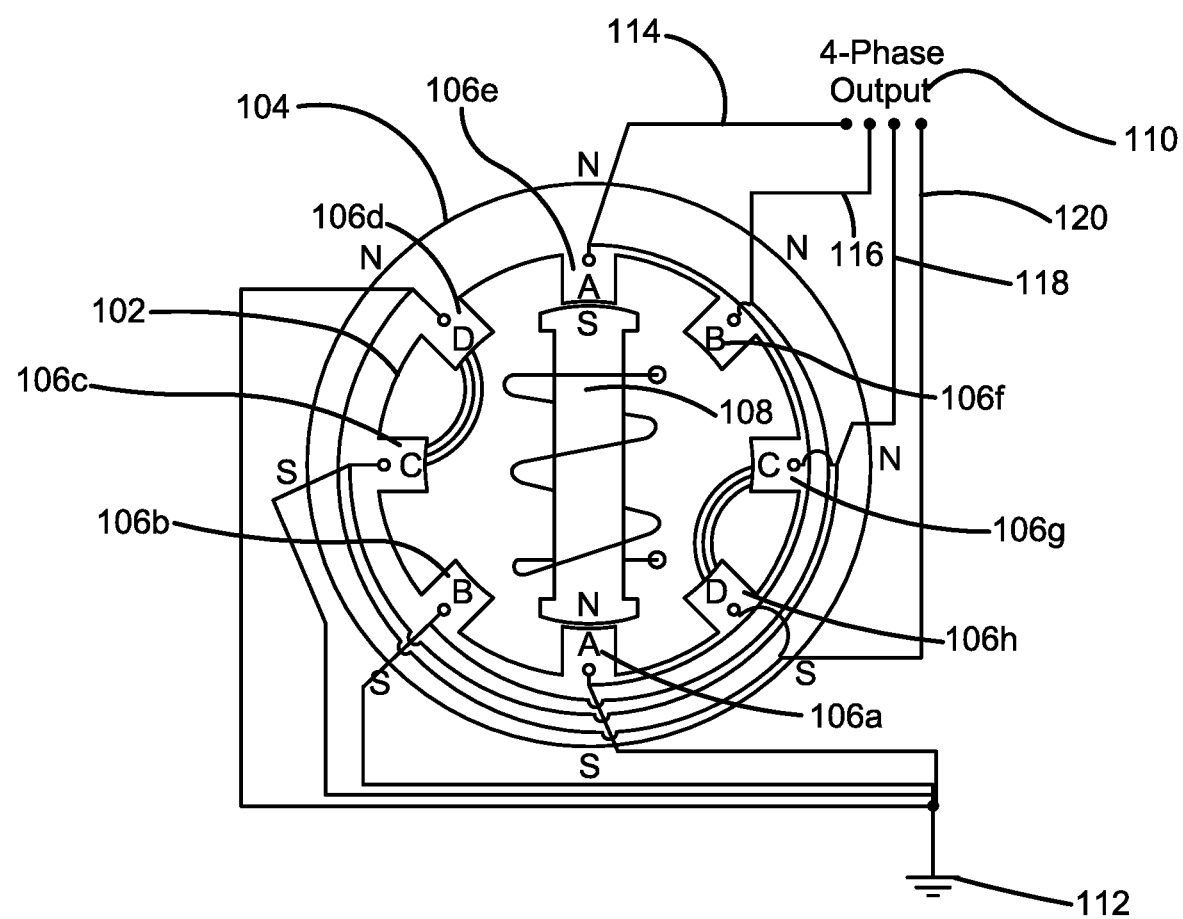
FIG. 1 illustrates an internal view of one potential embodiment of a 4-phase motor and generator of one potential embodiment of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for an electric generator designed to produce environmentally friendly electric power. There is also a long-felt need in the art for an electric generator that is more efficient than existing single, 2-phase, and 3-phase generators. Additionally, there is a long-felt need in the art for a novel electric generator that can be used for both residential applications and industrial applications. Moreover, there is a long-felt need in the art for an electric generator that has improved rotor balance and does not cause excessive vibrations. Further, there is a long-felt need in the art for an electric generator that consumes less power for generating electricity. Finally, there is a long-felt need in the art for a 4-phase electric generator that is configured to reduce harmful effects on the environment like greenhouse gas emissions.

The present invention, in one exemplary embodiment, is a method of operating a 4-Phase Motor and Generator device. The method comprising the steps of rotating an armature along a stator wall, the stator wall having a circular or cylindrical shape, eight salient poles ("stator slots") divided into four pole groups, each pole group has a N stator slot and a S stator slot, wherein four of the stator slots on one side of the stator wall correspond to the other four of the stator slots on an opposing side of the stator wall; alternating activation between N stator slots and S stator slots of the four pole groups in response to the rotation of the armature, wherein only six of the eight poles are actively coupled in any given configuration; and generating electrical energy with increased efficiency compared to 1-phase, 2-phase, or 3-phase motors.

For the present disclosure, an Eccentric load or rotor mass diagram is considered as a rotor unbalance diagram and is a graphical representation of the eccentricity of the rotor mass in a generator. The diagram is used to determine the amount and location of unbalance in the rotor and to ensure that the generator runs smoothly without causing excessive vibrations. The Eccentric load or rotor mass diagram shows the location and magnitude of the unbalance forces acting on the rotor due to the eccentricity of the rotor mass.

Referring initially to the drawings, FIG. 1 illustrates an internal view of one potential embodiment of a 4-phase motor and generator of one potential embodiment of the present invention in accordance with the disclosed architecture. The 4-phase motor and generator 100 of the present invention is configured as an electrical machine that converts mechanical energy into electrical energy and vice versa. The generator 100 is more efficient than conventional generators and consumes less energy. More specifically, the machine 100 includes a stator wall 102 and an armature 104. The stator wall 102 features four phases of functional operation, which is an advantage over existing 1-phase, 2-phase, and 3-phase motors. As illustrated, the stator wall 102 has eight stator slots 106a, 106b, 106c, 106d, 106e, 106f, 106g, 106h denoted as "A-A" 106a, 106e; "B-B" 106b, 106f; "C-C" 106c, 106g; and "D-D" 106d, 106h. Four stator slots 106a, 106b, 106c, 106d on one side of the stator wall 102 correspond to the other four stator slots 106e, 106f, 106g, 106h, for a symmetrical polarity on the stator wall 102. Preferably, the North polarity stator slots (106d, 106e, 106f, 106g) are positioned on one side of the stator wall 102 and the South polarity stator slots (106a, 106b, 106c, 106h) are positioned on the other side of the stator wall 102. The stator slots are arranged in a symmetrical pattern around the stator wall 102 and the stator wall 102 has a circular or cylindrical shape.

The four pole groups are configured on the stator wall 102 and each pole group includes a pair of corresponding stator slots on opposing sides of the stator wall 102. As a result, the one pole group is defined by two "A-A" stator slots, and similarly other pole groups are defined by corresponding "B-B" stator slots together, "C-C" stator slots together, and "D-D" stator slots together. During use, the rotation of the armature 104 causes the four pole groups to alternate in activation between N stator slots and S stator slots. This alternation results in a rotating magnetic field within the stator wall, which generates an electrical current in the armature. This configuration is beneficial because only six of the eight poles are actively coupled in any given configuration, which results in less energy consumption.

The stator wall 102 is preferably made of a magnetic material, and the activation of the pole groups results in a rotating magnetic field within the stator wall. The armature 104 functions as a rotor and includes a plurality of conductive windings. A permanent magnet 108 is positioned at the center of the stator wall 102 and has opposite North and South poles for creating additional magnetic field. It should be appreciated that the 4-phase generator 100 can also function as a motor by supplying electrical energy to the armature 104, which causes it to rotate and produce mechanical energy.

It should be appreciated that the generator 100 of the present invention in 4-phase generator having formed four pole groups alternating between N stator slots and S stator slots, thereby consuming less electrical energy than existing 1-phase, 2-phase, and 3-phase motors and thus increases energy efficiency. Further, the 4-phase generator 100 reduces harmful effects on the environment like greenhouse gas emissions. In the preferred embodiment, three N stator slots and one S stator slot are used for providing 4-phase output 110. As illustrated, the slots 106e, 106f, 106g, 106h are used for the output wherein the slot 106h is S stator slot. Similarly, the other three S stator slots and the remaining N stator slot are used for providing neutral connection to the generator 100 at the neutral point 112.

For each pair of opposing stator slots, a common coil is connected to opposing stator slots wherein the coil extends from the output 110 and connects to the opposite slots and terminate at the neutral point 112. The common coil 114 is for the stator slots 106a, 106e, the common coil 116 is for the stator slots 106b, 106f, the common coil 118 is for the stator slots 106c, 106g and the common coil 120 is for the stator slots 106d, 106h.

Figure 2:
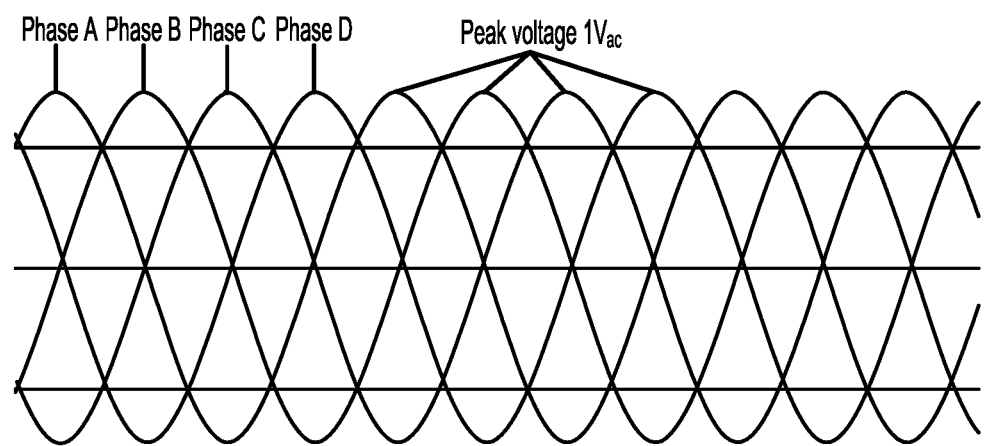
FIG. 2 illustrates a phase diagram showing four phases offered by the 4-phase generator of the present invention in accordance with the disclosed architecture.

FIG. 2 illustrates a phase diagram showing four phases offered by the 4-phase generator of the present invention in accordance with the disclosed architecture. As illustrated, the phase diagram 200 displays voltage as a function of time and peak voltage for each phase is 1 Vac. Each of the four phases is formed by a different set of opposing stator slots. As an example, Phase A is formed by opposing stator slots 106a, 106e, Phase B is formed by opposing stator slots 106b, 106f, Phase C is formed by opposing stator slots 106c, 106g and Phase D is formed by opposing stator slots 106d, 106h. The peak voltage of each phase is formed when the permanent magnet 108 aligns with the opposing stator slots. By way of example, as illustrated in FIG. 1, the South pole and North pole of the magnet 108 align with the opposing stator slots 106e, 106a, respectively, as a result, the peak voltage of Phase A is achieved in the illustrated configuration. As the magnet 108 rotates and aligns with other sets of opposing stator slots, the voltage varies and peak voltage is achieved.

Figure 3:
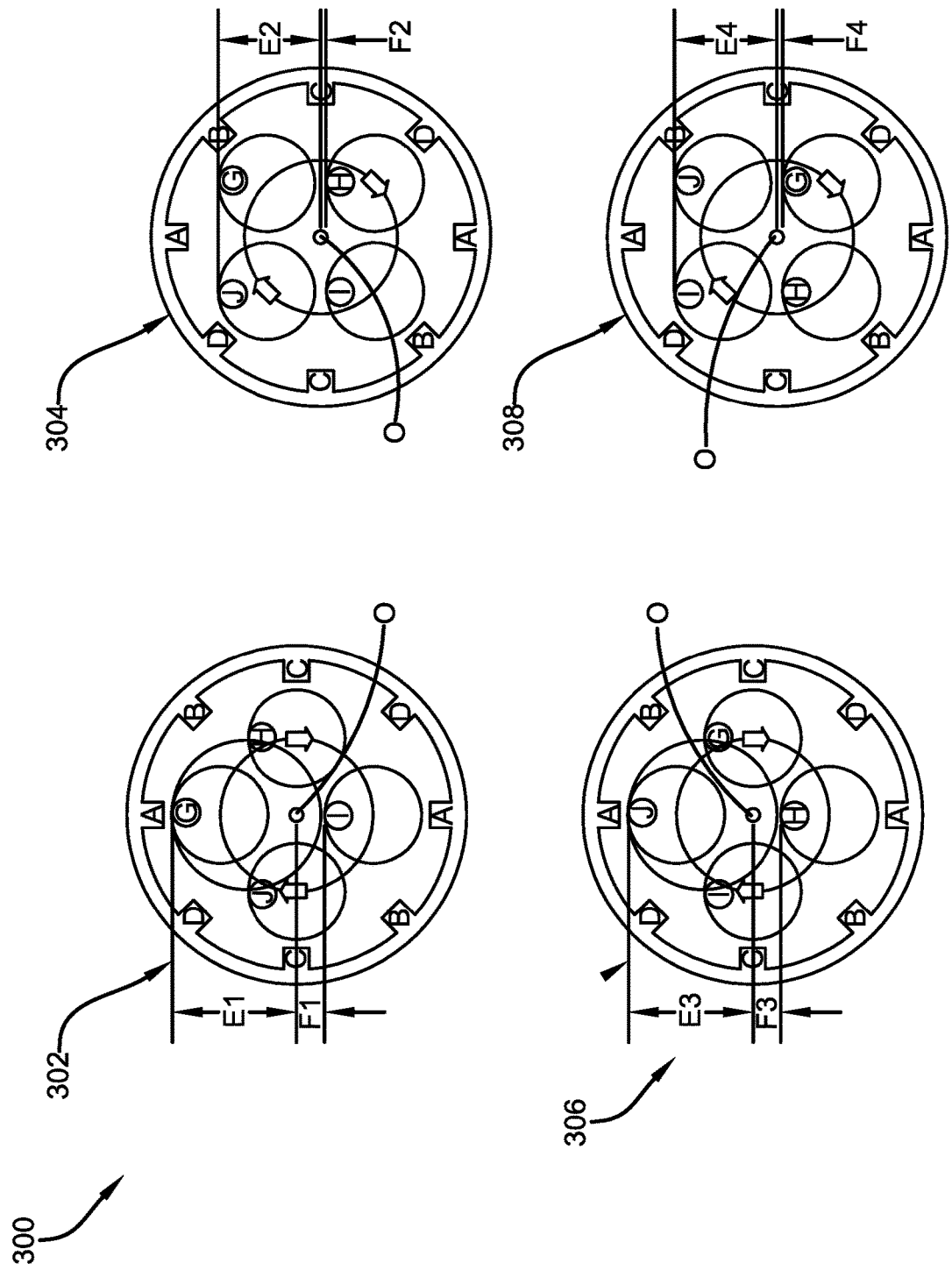
FIG. 3 illustrates an exemplary eccentric load or rotor mass diagram for the functioning of the 4-phase motor and generator device of the present invention in accordance with the disclosed architecture.

FIG. 3 illustrates an exemplary eccentric load or rotor mass diagram for the functioning of the 4-phase motor and generator device of the present invention in accordance with the disclosed architecture. The Eccentric load or rotor mass Diagram 300 illustrates a graphical representation of the eccentricity of the rotor mass in the 4-Phase Motor and Generator 100. The diagram illustrates the relationship between the stator wall 102 and the eccentric load or rotor mass, which is the unbalanced mass that causes the rotor to vibrate. The diagram 300 as divided illustrates four circles, each corresponding to one phase of the 4-Phase Motor and Generator. The first circle 302 indicates the starting point of the rotation of the center axis of the rotor, which is clockwise in this case. However, the motor can also be wired for counterclockwise rotation per the application if required. In Circle 302, the "A" phase is powered first.

The eccentric load or rotor mass is indicated by the letter "G," which is located at a distance "E1" from the center axis of rotation "O". The eccentric load or rotor mass is indicated by the letter "I" and is located at a distance "F1" from the center axis of rotation "O". Additionally, the circle 302 shows the location of the eccentric load or rotor mass, indicated by the letter "J," and the location of the eccentric load or rotor mass, indicated by the letter "H." These locations are important for determining the amount and location of unbalance in the rotor and for ensuring that the generator runs smoothly without causing excessive vibrations.

In Circle 304 (i.e., "B" phase), the eccentric load or rotor mass "G" and "J" are both located at a distance "E2" from the center axis of rotation "O", while the eccentric load or rotor mass "I" and "H" are located at a distance "F2" from the center axis of rotation. In Circle 306 (i.e., "C" phase), the eccentric load or rotor mass "J" is located at a certain distance "E3" from the center axis of rotation "O", while the eccentric load or rotor mass "H" is located at a distance "F3"

from the center axis of rotation "O". This configuration affects the overall balance of the rotor and the amount of vibration it produces.

In Circle 308 (i.e., "D" phase), the eccentric load or rotor mass "I" and "J" are both located at a distance "E4" from the center axis of rotation "O", while the eccentric load or rotor mass "H" and "G" are located at a distance "F4" from the center axis of rotation "O". The location of these masses affects the balance of the rotor and the amount of vibration it produces during operation.

Figure 4:
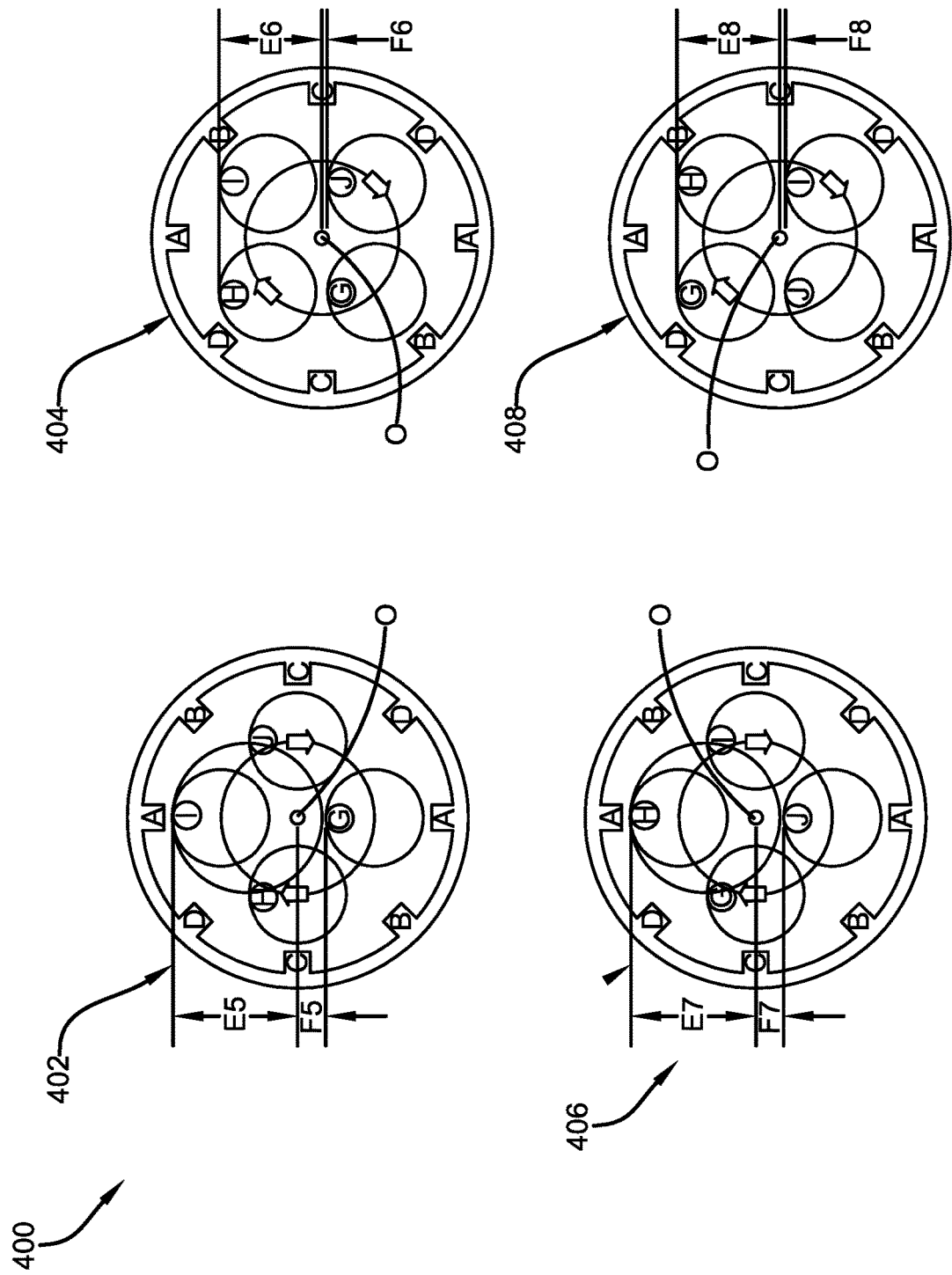
FIG. 4 illustrates another eccentric load or rotor mass diagram for the functioning of the 4-phase motor and generator device of the present invention in accordance with the disclosed architecture.

FIG. 4 illustrates another eccentric load or rotor mass diagram for the functioning of the 4-phase motor and generator device of the present invention in accordance with the disclosed architecture. Eccentric load or rotor mass Diagram 400, as shown in FIG. 4, is similar to Eccentric load or rotor mass Diagram 300 (FIG. 3) and displays the relationship between the 4-phase stator wall and eccentric load or rotor masses. However, the eccentric load or rotor masses are located differently in diagram 400. Starting with the top left Circle 402, the circle 402 illustrates eccentric load or rotor mass "I", which is located at a distance "E5" from the center axis of rotation "O", while eccentric load or rotor mass "G" is located at a distance "F5" from the center axis of rotation "O". The eccentric load or rotor mass locations of H and J are also displayed in the circle 402.

The Circle 404, eccentric load or rotor masses "H" and "I" are at a distance "E6" from the center axis of rotation "O", while eccentric load or rotor masses "G" and "J" are at a distance "F6" from the center axis of rotation "O". The Circle 406 illustrates eccentric load or rotor mass H, which is at a distance "E7" from the center axis of rotation, while eccentric load or rotor mass "J" is at a distance "F7" from the center axis of rotation "O". Circle 408 illustrates eccentric load or rotor masses "G" and "H", which are at a distance "E8" from the center axis of rotation "O", while eccentric load or rotor masses "J" and "I" are at a distance "F8" from the center axis of rotation "O". This cycle now repeats to Eccentric load or rotor mass Diagram 300 then Eccentric load or rotor mass Diagram 400 and so on. The alternating pattern of the eccentric load or rotor masses in the two diagrams 300, 400 helps to balance the eccentric loads and minimize vibrations in the motor or generator 100.

Figure 5:
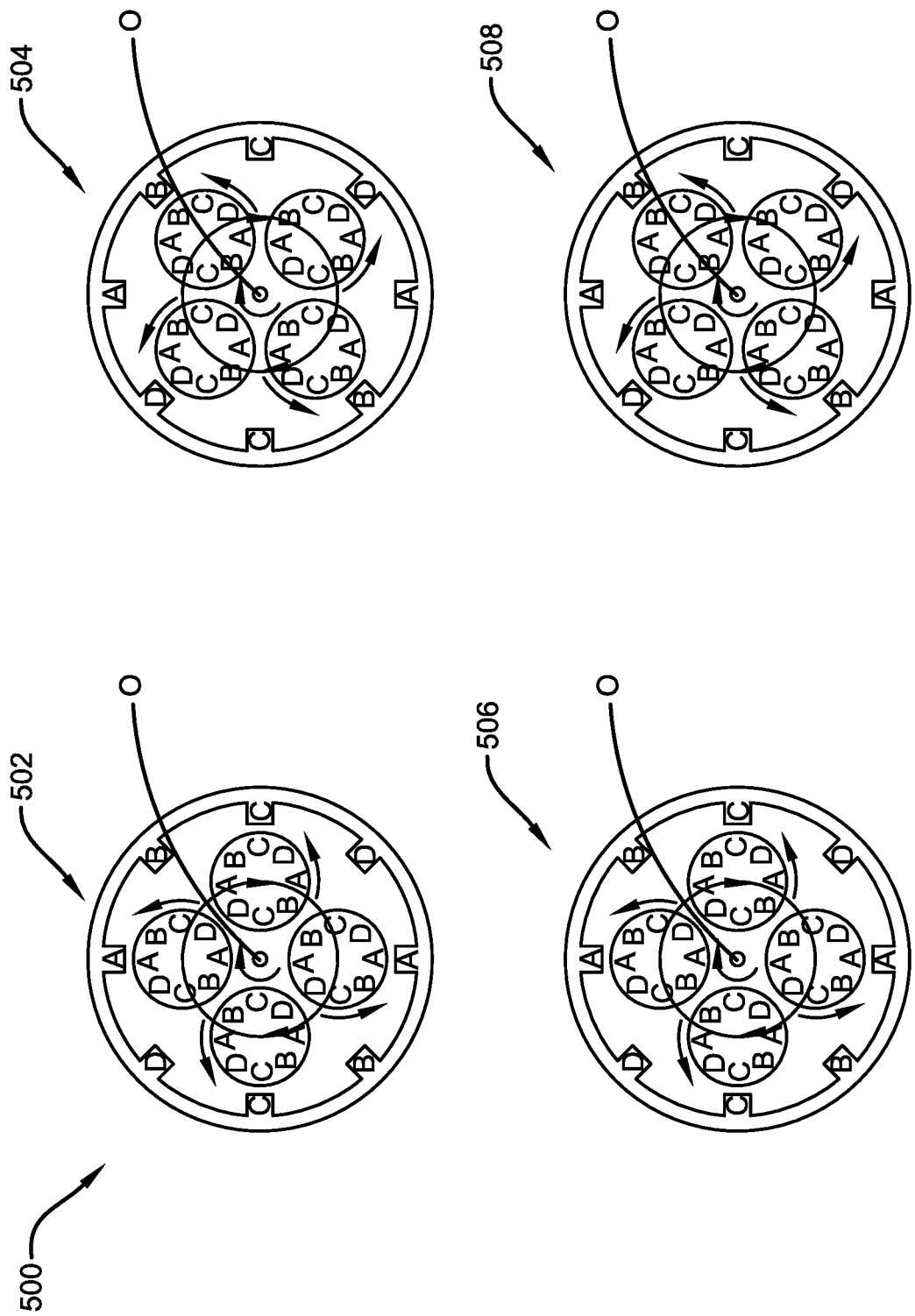
FIG. 5 illustrates another eccentric load or rotor mass diagram, with relationship to a stator wall (i.e. stator wall #1), for the functioning of the 4-phase motor and generator device of the present invention in accordance with the disclosed architecture.

FIG. 5 illustrates another eccentric load or rotor mass diagram for the functioning of the 4-phase motor and generator device of the present invention in accordance with the disclosed architecture. Eccentric load or rotor mass diagrams 500, as shown in FIG. 5, display four armatures electrical/magnetic relationships with, for example, stator wall #1. As shown, the rotation of the center axis O is clockwise. However, it is to be appreciated that the rotation can be arranged in a counterclockwise orientation. Starting with the top left diagram 502, the diagram 502 illustrates a power source providing power to the armatures and stator wall, resulting in the armatures revolving about the center axis of rotation O and facing a first direction. The stator and armature of diagram 502 displays the 4-phase stator wall magnetic relationship with the 4-phase armatures with A phase power first. Thus, diagram 502 represents a display of A phase power stator wall and armatures energized. Diagram 504 illustrates a power source providing power to the armatures and stator wall, resulting in the armatures revolving about the center axis of rotation O and facing a second direction. The stator and armature of diagram 504 displays the 4-phase stator wall magnetic relationship with the 4-phase armatures with B phase power second. Thus, diagram 504 represents a display of B phase power stator wall and armatures energized. Diagram 506 illustrates a power source providing power to the armatures and stator wall, resulting in the armatures revolving about the center axis of rotation O and facing the first direction. The stator and armature of diagram 506 displays the 4-phase stator wall magnetic relationship with the 4-phase armatures with C phase power third. Thus, diagram 506 represents a display of C phase power stator wall and armatures energized. Diagram 508 illustrates a power source providing power to the armatures and stator wall, resulting in the armatures revolving about the center axis of rotation O and facing the second direction. The stator and armature of diagram 506 displays the 4-phase stator wall magnetic relationship with the 4-phase armatures with D phase power fourth. Thus, diagram 508 represents a display of D phase power stator wall and armatures energized. The full revolution cycle repeats again from 508 to 502, next to 504, and then to 506, resulting in armatures revolving about the center axis of rotation and facing the same direction while revolving about the center axis or rotation. The revolutions per minute of the center axis of rotation shall be increased or decreased to maximize or minimize the effects of the eccentric mass load upon the center axis of rotation.

Diagrams 500 represent one system that rotates in a counterclockwise motion of its center axis and a second system that rotates in a clockwise motion of its center axis of rotation. Each of these systems 502, 504, 506, 508 can be one in front of the other so that the eccentric load mass is always peaking at the A phase to control the effects of the eccentric mass loads upon the center axis of rotation O, resulting in the systems illustrated in FIGS. 3 and 4 moving in the direction of greatest distance of eccentric mass loads J, G, H, and I, defined as E1, E2, E3, E4, E5, E6, E7, and E8, distance from center axis of rotation O.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "4-phase motor and generator device", "4-phase generator", "generator", and "motor and generator device" are interchangeable and refer to the 4-phase motor and generator device 100 of the present invention.

Notwithstanding the forgoing, the 4-phase motor and generator device 100 of the present invention can be of any suitable size and configuration as is known in the art without affecting the overall concept of the invention, provided that it accomplishes the above-stated objectives. One of ordinary skill in the art will appreciate that the 4-phase motor and generator device 100 as shown in the FIGS. are for illustrative purposes only, and that many other sizes and shapes of the 4-phase motor and generator device 100 are well within the scope of the present disclosure. Although the dimensions of the 4-phase motor and generator device 100 are important design parameters for user convenience, the 4-phase motor and generator device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A four-phase motor and generator combination comprising:
   a phase motor;
   a generator having a stator wall and an eccentric rotor mass;
   wherein said stator wall having eight stator slots and four phases of functional operation;
   wherein said stator wall having a first four stator slots on a first side of said stator wall corresponding to a second four stator slots on an opposing second side of said stator wall;
   wherein said first four stator slots on said first side are in symmetrical polarity with said second four stator slots on said second side;
   wherein said first four stator slots are North polarity stator slots positioned on said first side of said stator wall and wherein said second four stator slots are South polarity stator slots positioned on said second side of said stator wall;
   wherein said first four stator slots and said second four stator slots are arranged in a symmetrical pattern around said stator wall;
   a group of poles including four pole groups positioned on said stator wall wherein each pole group having a pair of corresponding stator slots on opposing side of said stator wall;
   rotation of said eccentric rotor mass moves said four pole groups to alternate in activation between said North polarity stator slots and said South polarity stator slots;
   wherein said alternation results in a rotating magnetic field within said stator wall; and
   further wherein only three pole groups of said four pole groups actively coupled in said rotation.

2. The four-phase motor and generator combination of claim 1, wherein said four pole groups having a first pole group defined by two "A-A" stator slots, a second pole group defined by two "B-B" stator slots, a third pole group defined by two "C-C" stator slots, and a fourth pole group defined by two "D-D" stator slots.

3. The four-phase motor and generator combination of claim 2, wherein said stator wall is circular in shape.

4. The four-phase motor and generator combination of claim 2, wherein said stator wall is cylindrical in shape.

5. The four-phase motor and generator combination of claim 1, wherein said alternation causes a rotating magnetic field within said stator wall.

6. The four-phase motor and generator combination of claim 5, wherein three pole groups out of said four pole groups of said first pole group, said second pole group, said third pole group, and said fourth pole group are actively coupled.

7. The four-phase motor and generator combination of claim 6, wherein said stator wall is a magnetic material.

8. The four-phase motor and generator combination of claim 1, wherein each pair of opposing stator slots having a common coil connected to said pair of opposing stator slots, further wherein said common coil extends from an output connection, connects to said opposing slots, and terminates at a neutral connection.

9. The four-phase motor and generator combination of claim 8, wherein a first common coil connects said first pole group of said two "A-A" stator slots, a second common coil connects said second pole group of said two "B-B" stator slots, a third common coil connects said third pole group of said two "C-C" stator slots, and a fourth common coil connects said fourth pole group of said two "D-D" stator slots.

10. The four-phase motor and generator combination of claim 9, wherein three said North polarity stator slots and one said South polarity stator slot are used for said output connection, and three of said South polarity stator slots and one said North polarity slot are used for said neutral connection.

11. A method of rotating a load mass in a four-phase motor and generator comprising the steps of:
    providing a phase motor and a generator having a stator wall and an eccentric rotor mass;
    wherein said stator wall having eight stator slots and four phases of functional operation;
    wherein said stator wall having a first four stator slots on a first side of said stator wall corresponding to a second four stator slots on an opposing second side of said stator wall;
    wherein said first four stator slots on said first side are in symmetrical polarity with said second four stator slots on said second side;
    wherein said first four stator slots are North polarity stator slots positioned on said first side of said stator wall and wherein said second four stator slots are South polarity stator slots positioned on said second side of said stator wall;
    arranging said first four stator slots and said second four stator slots in a symmetrical pattern around said stator wall;
    positioning a group of poles including four pole groups on said stator wall wherein each pole group having a pair of corresponding stator slots on opposing sides of said stator wall;
    rotating said eccentric rotor mass;
    moving sequentially said eccentric rotor mass from a first stator slot alignment, to a second stator slot alignment, to a third stator slot alignment, and then to a fourth stator slot alignment;
    wherein said first stator slot alignment having a first offset distance E2 from a center axis of rotation;
    wherein said second stator slot alignment having a second offset distance F2 from said center axis of rotation; and
    further wherein said second offset distance is less than said first offset distance.

12. The method of rotating a load mass in the four-phase motor of claim 11, wherein said rotating step results in a rotating magnetic field within said stator wall.

13. The method of rotating a load mass in the four-phase motor of claim 11 further comprising a step of moving said four pole groups to alternate in activation between said North polarity stator slots and said South polarity stator slots.

14. A method of rotating a load mass in a four-phase motor and generator comprising the steps of:
providing a phase motor and a generator having a stator wall and an eccentric rotor mass;
wherein said stator wall having eight stator slots and four phases of functional operation;
wherein said stator wall having a first four stator slots on a first side of said stator wall corresponding to a second four stator slots on an opposing second side of said stator wall;
wherein said first four stator slots on said first side are in symmetrical polarity with said second four stator slots on said second side;
wherein said first four stator slots are North polarity stator slots positioned on said first side of said stator wall and wherein said second four stator slots are South polarity stator slots positioned on said second side of said stator wall;
arranging said first four stator slots and said second four stator slots in a symmetrical pattern around said stator wall;
positioning a group of poles including four pole groups on said stator wall wherein each pole group having a pair of corresponding stator slots on opposing sides of said stator wall;
rotating said eccentric rotor mass;
moving sequentially said eccentric rotor mass from a first stator slot alignment, to a second stator slot alignment, to a third stator slot alignment, and then to a fourth stator slot alignment;
wherein said first stator slot alignment having a first offset distance E2 of said eccentric rotor mass from a center axis of rotation;
wherein said second stator slot alignment having a second offset F2 distance of said eccentric rotor mass from said center axis of rotation;
wherein said third stator slot alignment having a third offset distance E3 of said eccentric rotor mass from said center axis of rotation;
wherein said fourth stator slot alignment having a fourth offset distance F3 of said eccentric rotor mass from said center axis of rotation;
wherein said second offset distance is less than said first offset distance;
wherein said third offset distance is equal to said first offset distance;
wherein said fourth offset distance is less than said third offset distance; and
moving sequentially said eccentric rotor mass from said fourth stator slot alignment, to said first stator slot alignment, to said second stator slot alignment, to said third stator slot alignment, and then to said fourth stator slot alignment.

15. The method of rotating a load mass in the four-phase motor of claim 14, wherein said each pair of corresponding stator slots having a common coil connected to said pair of opposing stator slots, further wherein said common coil extends from an output connection, connects to said opposing slots, and terminates at a neutral connection.

16. The method of rotating a load mass in the four-phase motor of claim 15, wherein a first common coil connects said first pole group of said first stator slot alignment, a second common coil connects said second pole group of said second stator slot alignment, a third common coil connects said third pole group of said third stator slot alignment, and a fourth common coil connects said fourth pole group of said fourth stator slot alignment.

17. The method of rotating a load mass in the four-phase motor of claim 16, wherein three said North polarity stator slots and one said South polarity stator slot are used for said output connection, and three of said South polarity stator slots and one said North polarity slot are used for said neutral connection.

* * * * *